(12) United States Patent
Sumikawa et al.

(10) Patent No.: US 11,256,301 B2
(45) Date of Patent: Feb. 22, 2022

(54) INFORMATION PROCESSING APPARATUS AND CONTROL METHOD

(71) Applicant: Lenovo (Singapore) Pte. Ltd., Singapore (SG)

(72) Inventors: Toshinari Sumikawa, Kanagawa (JP); Yosuke Katayama, Kanagawa (JP); Hiroki Oda, Kanagawa (JP); Yuta Tagami, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/194,974

(22) Filed: Mar. 8, 2021

(65) Prior Publication Data

US 2021/0311527 A1 Oct. 7, 2021

(30) Foreign Application Priority Data

Apr. 1, 2020 (JP) .............................. JP2020-65936

(51) Int. Cl.
| | | |
|---|---|---|
| *G06F 1/00* | (2006.01) | |
| *G06F 1/16* | (2006.01) | |
| *G06F 1/3206* | (2019.01) | |
| *G06F 1/3296* | (2019.01) | |

(52) U.S. Cl.
CPC .......... *G06F 1/1677* (2013.01); *G06F 1/3206* (2013.01); *G06F 1/3296* (2013.01)

(58) Field of Classification Search
CPC .... G06F 1/1677; G06F 1/3206; G06F 1/3212; G06F 1/3265; G06F 1/3287; G06F 1/3296
See application file for complete search history.

(56) References Cited

FOREIGN PATENT DOCUMENTS

| | | |
|---|---|---|
| JP | H08339244 A | 12/1996 |
| JP | 2004185051 A | 7/2004 |
| JP | 2011008688 A | 1/2011 |
| JP | 2011134187 A | 7/2011 |
| JP | 2016031650 A | 3/2016 |
| JP | 6409240 B1 | 10/2018 |
| JP | 2019016902 A | 1/2019 |
| JP | 2019046391 A | 3/2019 |

*Primary Examiner* — Nitin C Patel
(74) *Attorney, Agent, or Firm* — Osha Bergman Watanabe & Burton LLP

(57) ABSTRACT

An information processing apparatus includes: a main control unit that executes processing based on an operating system (OS) and that changes to a low power consumption mode to stop some functions including a display unit while making a predetermined function work; a setting information storage unit that stores a usage status mode based on usage status and setting information in association with one another, where the setting information indicates whether to stop the predetermined function implemented by a device driver added to the OS in the low power consumption mode; a mode control unit that changes the main control unit to the low power consumption mode; and a change processing unit that changes a stopped state of the predetermined function.

10 Claims, 11 Drawing Sheets

| Usage status mode | Function | Setting |
|---|---|---|
| Tent Mode | Keyboard | Stopped |
| | WoV | Stopped |
| | HPD | Stopped |
| | ... | ... |
| Laptop mode | Keyboard | Working |
| | WoV | Working |
| | HPD | Stopped |
| | ... | ... |
| ... | ... | ... |

FIG. 4

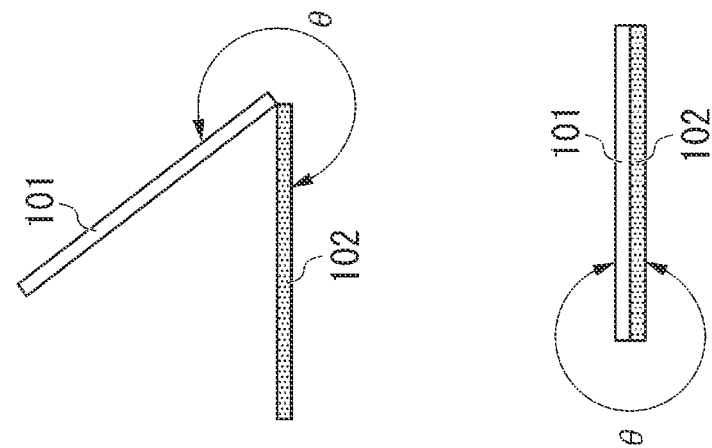
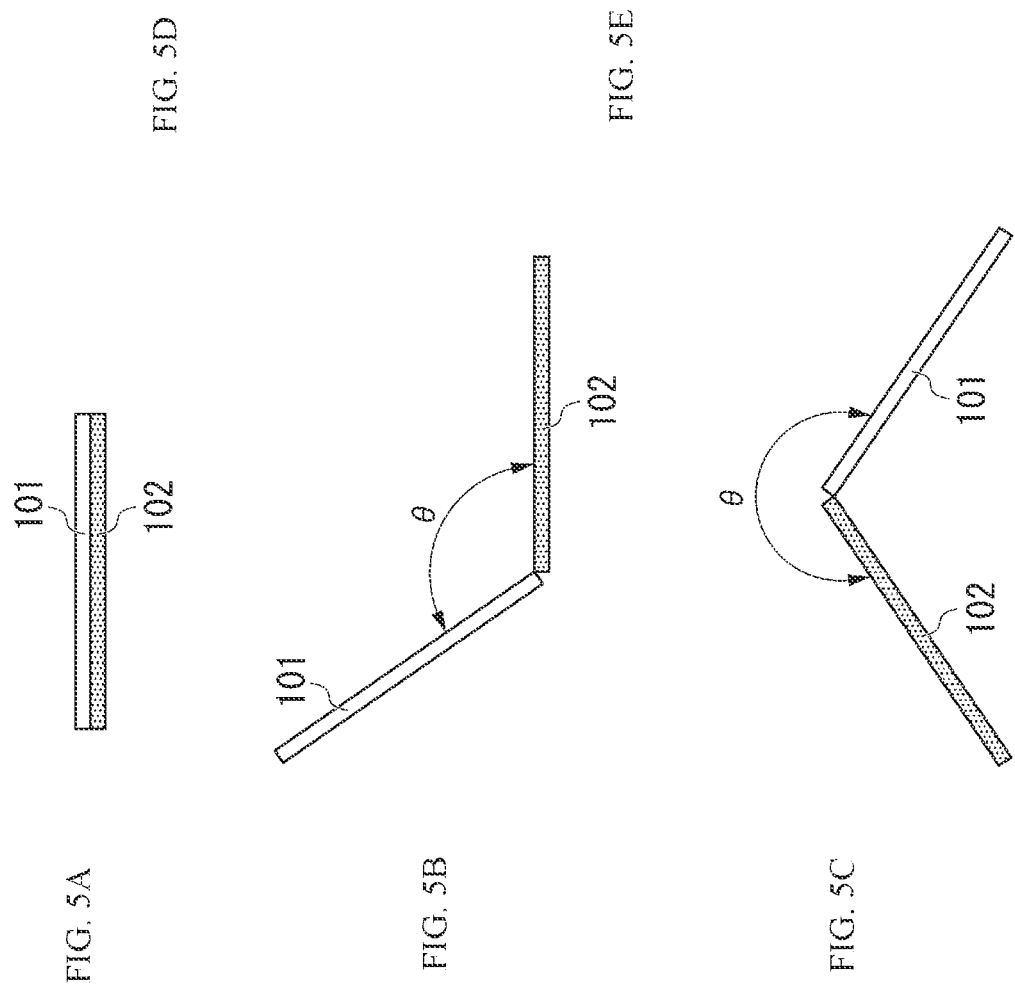
FIG. 5A  FIG. 5B  FIG. 5C  FIG. 5D  FIG. 5E

| Usage status mode | Function | Setting |
|---|---|---|
| Office mode | WoV | Stopped |
| | HPD | Working |
| | ... | ... |
| Outdoor mode | WoV | Stopped |
| | HPD | Stopped |
| | ... | ... |
| Home mode | WoV | Working |
| | HPD | Stopped |
| | ... | ... |
| ... | ... | ... |

FIG. 10

| Function | Power consumption | Office mode | Outdoor mode | Home mode |
|---|---|---|---|---|
| WoV | A1 | Stopped | Stopped | Working |
| HPD | B1 | Working | Stopped | Stopped |

FIG. 11

INFORMATION PROCESSING APPARATUS AND CONTROL METHOD

TECHNICAL FIELD

The present invention relates to an information processing apparatus and a control method.

BACKGROUND

In recent years, there has been known a technique for providing a low power consumption state (for example, S0ix state) that can be restored by an event-driven OS (Operating System) or application in an information processing apparatus such as a laptop personal computer (hereinafter a laptop PC). Further, for example, in Windows 10 (Windows is a registered trademark), Modern Standby using such an S0ix state is contained to achieve low power consumption by Modern Standby while making some functions work.

[Patent Document 1] Japanese Patent No. 6409240

However, the conventional information processing apparatus described above cannot set freely whether to stop functions managed by device drivers or the like in the low power consumption mode such as the Modern Standby. Therefore, the conventional information processing apparatus cannot set stopped functions properly according to the usage status, and hence may increase power consumption.

SUMMARY

One or more embodiments of the present invention provide an information processing apparatus and a control method capable of reducing power consumption properly according to the usage status.

In particular, an information processing apparatus according to the first aspect of the present invention includes: a main control unit which executes processing based on an OS (operating system) and can change to such a low power consumption mode as to stop some functions including a display unit while making a predetermined function work; a setting information storage unit which stores a usage status mode based on usage status and setting information in association with each other, where the setting information indicates whether or not to stop the predetermined function implemented by a device driver added to the OS in the low power consumption mode; a mode control unit which changes the main control unit to the low power consumption mode; and a change processing unit which changes a stopped state of the predetermined function according to the usage status mode based on the setting information stored in the setting information storage unit upon changing to the low power consumption mode by the mode control unit.

The above information processing apparatus may further include a state detection unit which detects the usage status, wherein the change processing unit acquires, from the setting information storage unit, the setting information corresponding to the usage status mode based on the usage status detected by the state detection unit to change the stopped state of the predetermined function based on the acquired setting information.

Further, the above information processing apparatus may further include an acceleration sensor which detects the acceleration of the own apparatus, wherein a used shape upon using the own apparatus is included in the usage status, the state detection unit detects the used shape based on the acceleration detected by the acceleration sensor, and the change processing unit changes the stopped state of the predetermined function based on the setting information corresponding to the usage status mode based on the used shape.

Further, the above information processing apparatus may be such that a usage location is included in the usage status, and the change processing unit changes the stopped state of the predetermined function based on the setting information corresponding to the usage status mode based on the usage location.

Further, the above information processing apparatus may be such that a usage time is included in the usage status, and the change processing unit changes the stopped state of the predetermined function based on the setting information corresponding to the usage status mode based on the usage time.

Further, the above information processing apparatus may be such that a power state indicative of whether the information processing apparatus is operated by the power of a built-in battery or not or a power state indicative of the remaining capacity of the battery is included in the usage status, and the change processing unit changes the stopped state of the predetermined function based on the setting information corresponding to the usage status mode based on the power state.

Further, the above information processing apparatus may further include a sub-control unit operating independently of the main control unit in a manner to be operable in the low power consumption mode, wherein when an event trigger has occurred via the sub-control unit, the mode control unit makes a transition to a normal working state and changes again to the state in which the some functions are stopped after execution of processing corresponding to the event trigger, and when the usage status mode is changed upon changing again to the state in which the some functions are stopped, the change processing unit changes the stopped state of the predetermined function based on the setting information according to the changed usage status mode.

Further, the above information processing apparatus may be such that background processing by the main control unit is executable in the low power consumption mode, and when the usage status mode is changed upon execution of the background processing by the main control unit, the change processing unit changes the stopped state of the predetermined function based on the setting information according to the changed usage status mode.

Further, the above information processing apparatus may further include a setting change unit which displays, on the display unit, the setting information corresponding to the usage status mode, and changes the setting information based on input information from an input unit and stores the changed setting information in the setting information storage unit.

A control method according to the second aspect of the present invention is a control method for an information processing apparatus including: a main control unit which executes processing based on an OS (operating system) and can change to such a low power consumption mode as to stop some functions including a display unit while making a predetermined function work; and a setting information storage unit which stores a usage status mode based on usage status and setting information in association with each other, where the setting information indicates whether or not to stop the predetermined function implemented by a device driver added to the OS in the low power consumption mode, the control method including: causing a mode control unit to change the main control unit to the low power consumption mode; and causing a change processing unit to change a stopped state of the predetermined function according to the usage status mode based on the setting information stored in the setting information storage unit upon changing to the low power consumption mode by the mode control unit.

The above-described aspects of the present invention can reduce power consumption properly according to the usage status.

BRIEF DESCRIPTION OF THE DRAWINGS

FIG. 4 is a table illustrating an example of data in a setting information storage unit according to the present embodiment.

FIGS. 5A-5E show a diagram illustrating a modification example of used shapes of the laptop PC according to the present embodiment.

FIG. 10 is a table illustrating another example of data in the setting information storage unit according to the present embodiment.

FIG. 11 is a table illustrating an example of setting information on the usage location and the function according to the present embodiment.

DETAILED DESCRIPTION

An information processing apparatus and a control method according to one embodiment of the present invention will be described below with reference to the accompanying drawings.

Figure 1:
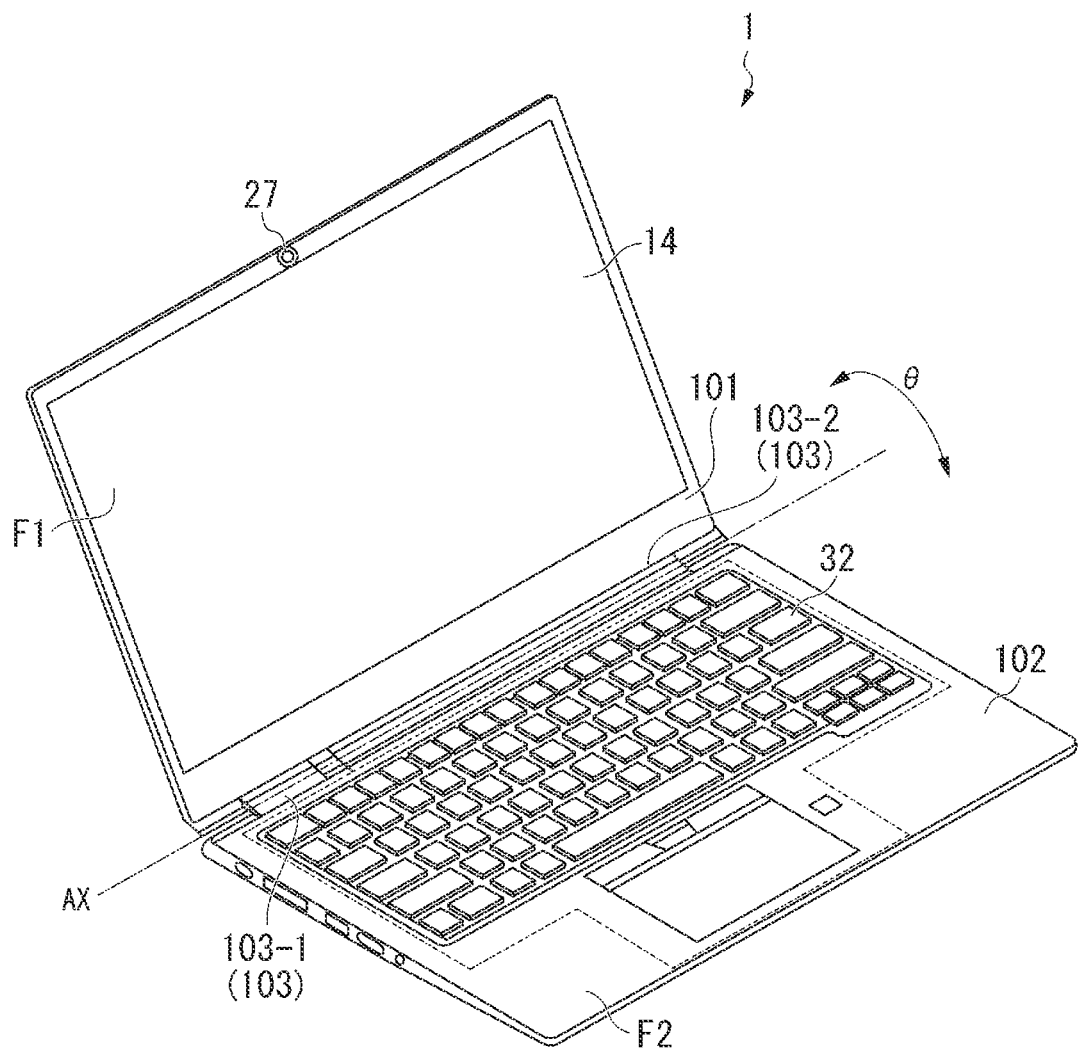
FIG. 1 is an external view illustrating an example of a laptop PC according to one embodiment.

FIG. 1 is an external view illustrating an example of a laptop PC 1 according to the present embodiment. In the present embodiment, the laptop PC 1 will be described as an example of the information processing apparatus.

As illustrated in FIG. 1, the laptop PC 1 includes a first chassis 101, a second chassis 102, and a hinge mechanism 103.

The first chassis 101 is a chassis equipped with a display unit 14 and a camera 27, which is connected to the second chassis 102 by the hinge mechanism 103. The display unit 14 is placed on the first chassis 101 in such a manner that a display surface F1 of the display unit 14 is made visible. The camera 27 is arranged on the same surface of the first chassis 101 as the display surface F1 of the display unit 14.

The second chassis 102 is a chassis having at least an input unit 32 such as a keyboard. The second chassis 102 is connected to the first chassis 101 by the hinge mechanism 103. The input unit 32 is placed on a surface F2 of the second chassis 102, and a motherboard with main hardware of the laptop PC 1 mounted thereon is housed inside the chassis.

The hinge mechanism 103 (an example of a rotation mechanism) couples the first chassis 101 and the second chassis 102 in such a manner that the first chassis 101 is rotatable around a rotation axis AX relative to the second chassis 102. In the present embodiment, although the laptop PC 1 includes two hinge mechanisms, that is, a hinge mechanism 103-1 and a hinge mechanism 103-2, the hinge mechanisms will be described as the hinge mechanism 103 below unless otherwise distinguished or unless any of the hinge mechanisms is indicated.

In the following description, the angle between the surface (display surface F1) of the first chassis 101 and the surface F2 of the second chassis 102 is called an opening/closing angle θ. The hinge mechanism 103 can rotate the first chassis 101 in a range of opening/closing angles θ from 0 degrees up to 360 degrees, and can maintain any opening/closing angle θ even when some torque is applied.

Figure 2:
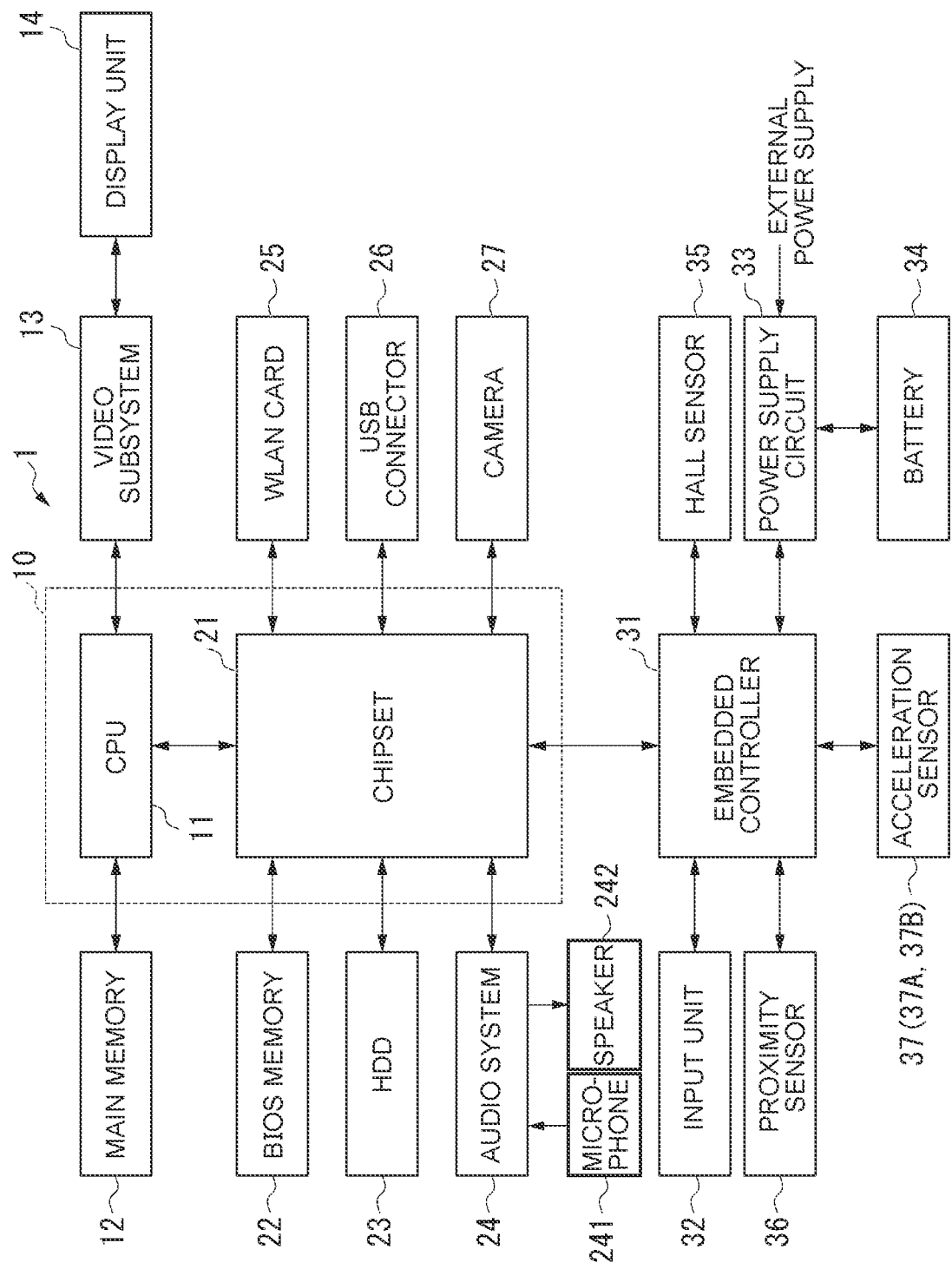
FIG. 2 is a diagram illustrating an example of the main hardware configuration of the laptop PC according to the present embodiment.

Referring next to FIG. 2, the main hardware configuration of the laptop PC 1 will be described.

FIG. 2 is a diagram illustrating an example of the main hardware configuration of the laptop PC 1 according to the present embodiment.

As illustrated in FIG. 2, the laptop PC 1 includes a CPU 11, a main memory 12, a video subsystem 13, the display unit 14, a chipset 21, a BIOS memory 22, an HDD 23, an audio system 24, a WLAN card 25, a USB connector 26, the camera 27, an embedded controller 31, the input unit 32, a power supply circuit 33, a battery 34, a Hall sensor 35, a proximity sensor 36, and an acceleration sensor 37.

The CPU (Central Processing Unit) 11 executes various kinds of arithmetic processing by program control to control the entire laptop PC 1.

The main memory 12 is a writable memory used as reading areas of execution programs of the CPU 11 or working areas to which processing data of the execution programs are written. The main memory 12 is configured, for example, to include plural DRAM (Dynamic Random Access Memory) chips. The execution programs include an OS (Operating System), various drivers for hardware-operating peripheral devices, various services/utilities, application programs, and the like.

The video subsystem 13 is a subsystem for realizing functions related to image display, which includes a video controller. This video controller processes a drawing command from the CPU 11, writes processed drawing information into a video memory, and reads this drawing information from the video memory and outputs it to the main display unit 14 as drawing data (display data).

The display unit 14 is, for example, a liquid crystal display to display a display screen based on the drawing data (display data) output from the video subsystem 13. As illustrated in FIG. 1, the display unit 14 is placed on the first chassis 101 in a manner to make the display surface F1 visible.

The chipset 21 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. In FIG. 2, the BIOS memory 22, the HDD 23, the audio system 24, the WLAN card 25, the USB connector 26, and the camera 27 are connected to the chipset 21 as examples of the devices.

Note that the CPU 11 and the chipset 21 correspond to a main control unit 10 in the present embodiment.

The BIOS (Basic Input Output System) memory 22 is configured, for example, by an electrically rewritable non-volatile memory such as an EEPROM (Electrically Erasable Programmable Read Only Memory) or a flash ROM. The BIOS memory 22 stores a BIOS and system firmware for controlling the embedded controller 31 and the like.

The HDD (Hard Disk Drive) 23 (an example of a non-volatile storage device) stores the OS, various drivers, various services/utilities, application programs, and various data. Note that the OS in the present embodiment is, for example, Windows 10 (Windows is a registered trademark).

A microphone 241 and a speaker 242 are connected to the audio system 24 which records, plays back, and outputs sound data. It is assumed as an example that the microphone 241 and the speaker 242 are incorporated in the laptop PC 1.

The WLAN (Wireless Local Area Network) card 25 is connected to a network by wireless LAN to perform data communication. When receiving data from the network, for example, the WLAN card 25 generates an event trigger indicating that data has been received.

The USB connector 26 is a connector for connecting peripheral devices using the USB.

The camera 27 (an example of an imaging unit) is, for example, a ToF camera (Time-of-Flight camera) to capture images. As illustrated in FIG. 1, the camera 27 is placed in an upper part of the display unit 14 in a laptop mode. The camera 27 is connected to the chipset 21 through a USB interface. The camera 27 is used, for example, to detect a user.

The embedded controller 31 (an example of a sub-control unit) is a one-chip microcomputer which monitors and controls various devices (peripheral devices, sensors, and the like) regardless of the system state of the laptop PC 1. Further, the embedded controller 31 has a power management function to control the power supply circuit 33. Note that the embedded controller 31 is composed of a CPU, a ROM, a RAM, and the like, which are not illustrated, and equipped with multi-channel A/D input terminal and D/A output terminal, a timer, and digital input/output terminals. To the embedded controller 31, for example, the input unit 32, the power supply circuit 33, the Hall sensor 35, the proximity sensor 36, the acceleration sensor 37, and the like are connected through these input/output terminals, and the embedded controller 31 controls the operation of these units.

The embedded controller 31 controls the power supply circuit 33 according to the system states (for example, S0 state to S5 state) defined in the ACPI (Advanced Configuration and Power Interface) specifications. Here, the S0 state is the most active state, which is a normal working state (normal operating state). Further, the S5 state is a shutdown state (power-off state) in which the power supply is turned off by software.

Note that the CPU 11 of the present embodiment supports S0ix state as a low power consumption state capable of being restored to the S0 state quickly, and the embedded controller 31 executes control of the power supply circuit 33 corresponding to a low power consumption mode (for example, Modern Standby mode) using this S0ix state. Here, the S0ix state is an extended state of the S0 state defined in the ACPI specifications, that is, a state in which the power consumption is reduced to be lower than the S0 state.

In the present embodiment, the Modern Standby mode is a low power consumption mode lower in power consumption than a normal operating mode indicative of the normal operation of the laptop PC 1. In the Modern Standby mode, the S0ix state described above and the S0 state where background processing is executed are switched and used in such a state that the display of the display unit 14 is turned off (stopped).

The input unit 32 includes, for example, an input device such as the keyboard and a pointing device such as a touch pad. As illustrated in FIG. 1, the input unit 32 is placed on the surface F2 of the second chassis 102.

The power supply circuit 33 includes, for example, a DC/DC converter, a charge/discharge unit, an AC/DC adapter, and the like to convert DC voltage supplied from an external power supply such as through the AC/DC adapter or supplied from the battery 34 into plural voltages required to operate the laptop PC 1. Further, the power supply circuit 33 supplies power to each unit of the laptop PC 1 under the control of the embedded controller 31.

The battery 34 is, for example, a lithium battery, which is charged through the power supply circuit 33 when power is supplied from the external power supply to the laptop PC 1, and outputs the charged power through the power supply circuit 33 as operating power of the laptop PC 1 when power is not supplied from the external power supply to the laptop PC 1.

The Hall sensor 35 is arranged, for example, inside the second chassis 102 to detect an ambient magnetic field. Note that a permanent magnet (not illustrated) is placed in the first chassis 101 at a position facing the Hall sensor 35 inside the second chassis 102 in a state where the first chassis 101 is closed, and the Hall sensor 35 is used in processing for detecting the strength of the magnetic field of the permanent magnet to identify whether the opening/closing angle θ is 0 degrees or 360 degrees.

The proximity sensor 36 is, for example, a capacitive sensor to detect the approach of an object.

The acceleration sensor 37 is, for example, a 3-axis acceleration sensor to detect acceleration. Note that the laptop PC 1 includes two acceleration sensors 37 (37A, 37B), and the detection results of the two acceleration sensors 37 (37A, 37B) are used to detect the opening/closing angle θ. The acceleration sensor 37A is arranged, for example, inside the first chassis 101, and the acceleration sensor 37B is arranged, for example, inside the second chassis 102.

Figure 3:
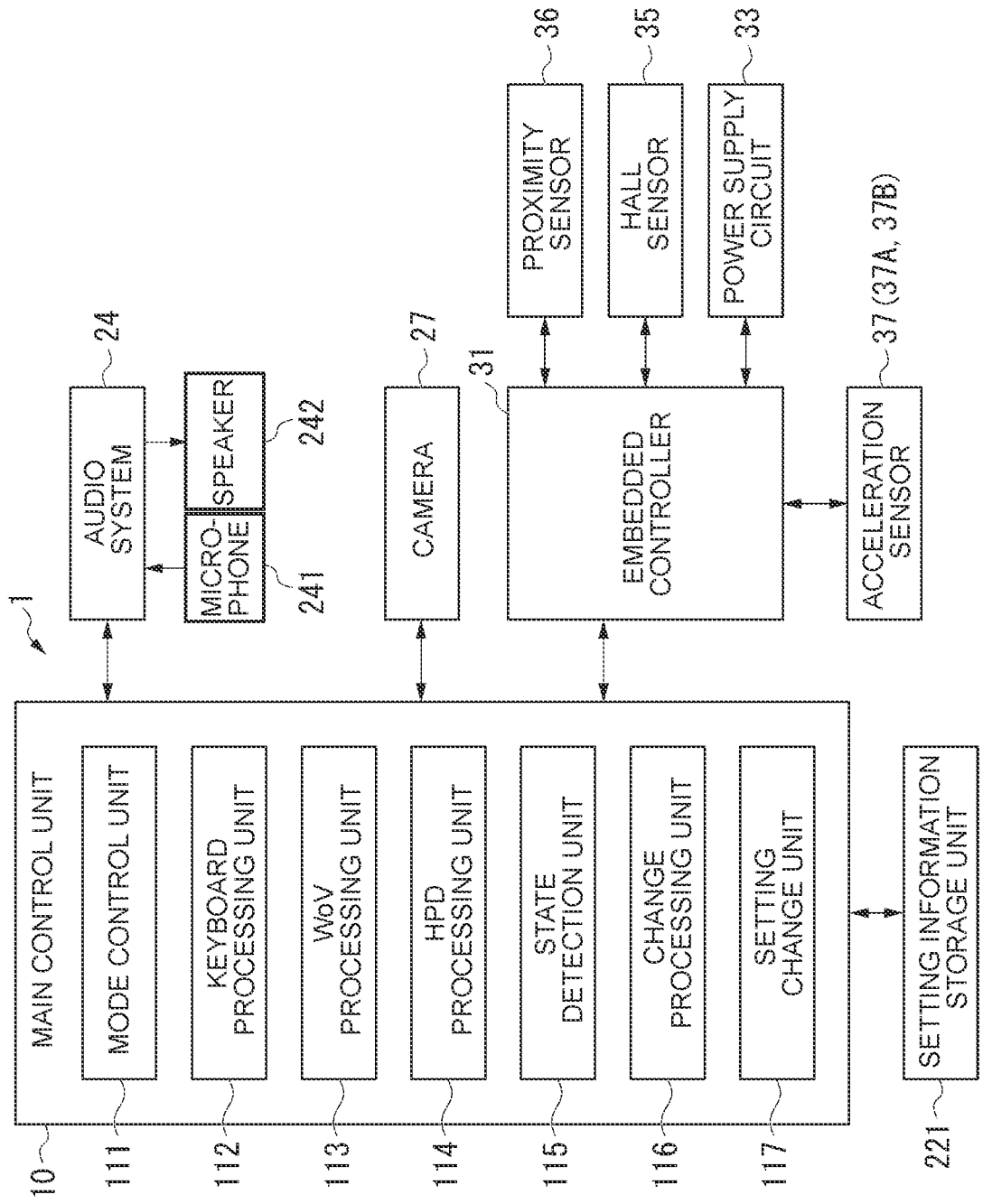
FIG. 3 is a block diagram illustrating an example of the functional configuration of the laptop PC according to the present embodiment.

Referring next to FIG. 3, the functional configuration of the laptop PC 1 according to the present embodiment will be described.

FIG. 3 is a block diagram illustrating an example of the functional configuration of the laptop PC 1 according to the present embodiment.

As illustrated in FIG. 3, the laptop PC 1 includes the main control unit 10, a setting information storage unit 221, the audio system 24, the microphone 241 and the speaker 242, the camera 27, the embedded controller 31, the power supply circuit 33, the Hall sensor 35, the proximity sensor 36, and the acceleration sensor 37 (37A, 37B).

Note that only the main functional configuration related to the invention of the present embodiment is illustrated in FIG. 3 as the configuration of the laptop PC 1.

Further, since the audio system 24, the microphone 241 and the speaker 242, the camera 27, the embedded controller 31, the power supply circuit 33, the Hall sensor 35, the proximity sensor 36, and the acceleration sensor 37 (37A, 37B) are the same as those illustrated in FIG. 2 described above, the description thereof will be omitted.

The setting information storage unit 221 is, for example, a storage unit realized by the BIOS memory 22 to store each usage status mode based on the usage status of the laptop PC 1 and setting information, indicative of whether a predetermined function implemented by a device driver added to the OS is stopped in the Modern Standby (low power consumption mode) or not, in association with each other. Note that the usage status of the laptop PC 1 includes, for example, the shape used, the usage location, the usage time, the power state, and the like.

Referring here to FIG. 4, an example of data stored in the setting information storage unit 221 will be described.

FIG. 4 is a table illustrating an example of data in the setting information storage unit 221 according to the present embodiment. Here, as an example, the usage status will be described as the shape used.

As illustrated in FIG. 4, the setting information storage unit 221 stores "Usage status mode," "Function," and "Setting" in association with one another. Here, the "Usage status mode" is the usage status mode based on the used shape, which includes a desktop mode, a tent mode, and the like. The details of the used shape and the usage status mode will be described later with reference to FIG. 5.

Further, the "Function" represents the predetermined function for which it is set whether to make it work or not (whether to stop it or not) in the Modern Standby. Further, the "Setting" represents the setting of whether to make each function work or not (whether to stop each function or not) in the Modern Standby. Note that the "Function" and the "Setting" correspond to the setting information.

In the example illustrated in FIG. 4, when the "Usage status mode" is the tent mode, it is represented that the functions of Keyboard, WoV (Wake on Voice), and HPD (Human Presence Detection) are "Stopped."

Further, when the "Usage status mode" is the desktop mode, it is represented that the functions of Keyboard, WoV, and HPD are "Working."

Returning to FIG. 3, the main control unit 10 is a functional unit implemented by causing the CPU 11 and the chipset 21 to execute programs stored in the BIOS memory 22 and the HDD 23, and the main control unit 10 executes processing based on the OS. The main control unit 10 can change to the Modern Standby for stopping some functions including the display unit 14 while making a predetermined function work based on the OS.

The main control unit 10 includes a mode control unit 111, a keyboard processing unit 112, a WoV processing unit 113, an HPD processing unit 114, a state detection unit 115, a change processing unit 116, and a setting change unit 117.

The mode control unit 111 is a functional unit implemented, for example, by a power management driver or the like as part of the OS to control changes in the system state of the laptop PC 1 (for example, S0 state to S5 state, the Modern Standby, and the like). For example, the mode control unit 111 controls the power supply circuit 33 and the like through the embedded controller 31 to perform control to change the main control unit 10 to the low power consumption mode.

Upon changing to the Modern Standby, the mode control unit 111 causes the change processing unit 116 to be described later to change the setting of each function (the setting of whether to stop or not in the Modern Standby) according to the usage status mode. After causing the change processing unit 116 to change the setting of each function, the mode control unit 111 causes the OS (main control unit 10) through the embedded controller 31 to make a transition to the Modern Standby. The mode control unit 111 once puts the main control unit 10 into the S0ix state, and then causes it to make the transition to the Modern Standby.

Further, when an event trigger for background processing has occurred in the Modern Standby, the mode control unit 111 changes the main control unit 10 from the S0ix state to the S0 state to cause the main control unit 10 to execute background processing. Note that the background processing is processing, not accompanied by the display of the display unit 14, such as processing for acquiring data (for example, mail data, update data of the OS or an application program, or the like) received by the WLAN card 25.

After the completion of the background processing, the mode control unit 111 changes the main control unit 10 from the S0 state to the S0ix state again.

Further, for example, when an event trigger from the acceleration sensor 37, the proximity sensor 36, or the like via the embedded controller 31 has occurred, the mode control unit 111 makes a transition to a normal working state (S0 state), and changes again to the state (S0ix state) in which some functions are stopped after executing processing corresponding to the event trigger.

The keyboard processing unit 112 is a functional unit implemented by a standard device driver built in the OS or the like to control, for example, the keyboard of the input unit 32 through the embedded controller 31.

The WoV processing unit 113 is a functional unit implemented by a WoV driver or the like added to the OS to execute WoV function processing such as to boot the laptop PC 1 by voice.

The HPD processing unit 114 is a functional unit implemented by an HPD driver or the like added to the OS to execute HPD function processing for detecting a person (for example, a user) around the laptop PC 1 using the proximity sensor 36, the camera 27, or the like.

Note that the WoV driver and the HPD driver are device drivers added to the OS unlike the standard device driver for performing keyboard processing. Further, the WoV function and the HPD function correspond to predetermined functions implemented by device drivers added to the OS. Further, for example, the predetermined functions implemented by device drivers include the functions of WoV, HPD, smart LED, booting via a touch panel, and volume adjustment of the speaker 242. The smart LED is a function to make an LED (light-emitting diode) emit light to give a notification, for example, when such a notification that a mail was received or the like has occurred during the Modern standby.

The state detection unit 115 is a functional unit which detects the usage status of the laptop PC 1. Here, for example, the usage status is the used shape of the laptop PC 1, and the state detection unit 115 detects the used shape based on the acceleration of the laptop PC 1 (own apparatus) detected by the acceleration sensor 37 (37A, 37B). For example, based on the detection results of the acceleration sensor 37 (37A, 37B), the state detection unit 115 detects the opening/closing angle θ, and based on the detected opening/closing angle θ, the state detection unit 115 detects the used shape (for example, the tent mode or the like).

Referring here to FIG. 5, the used shape of the laptop PC 1 will be described.

FIG. 5 is a diagram illustrating a modification example of used shapes of the laptop PC according to the present embodiment.

FIG. 5A illustrates a shape used in a closed mode of the laptop PC 1 (a shape with the lid closed). In this case, for example, the opening/closing angle θ is 0 degrees. When the opening/closing angle θ is 0 degrees, the state detection unit 115 detects that the used shape of the laptop PC 1 is the shape with the lid closed, and determines the usage status mode to be the closed mode.

Further, FIG. 5B illustrates the shape used in the laptop mode of the laptop PC 1 (laptop shape). In this case, for example, the opening/closing angle θ is in a range from more than 0 degrees to less than 190 degrees (0°<θ<190°). When the opening/closing angle θ is in the range from more than 0 degrees to less than 190 degrees (0°<θ<190°), the state detection unit 115 detects the used shape of the laptop PC 1 as the laptop shape, and determines the usage status mode to be the laptop mode.

Further, FIG. 5C illustrates the shape (tent shape) used in the tent mode of the laptop PC 1. In this case, for example, the opening/closing angle θ is in a range from 190 degrees or more to less than 360 degrees (190°≤θ<360°). In the shape used in the tent mode (tent shape), since the hinge mechanism 103 faces up, the used shape can be determined from the direction of acceleration (gravitational acceleration) detected by the acceleration sensor 37 (37A, 37B). When the opening/closing angle θ is in the range from 190 degrees or more to less than 360 degrees (190°≤θ<360°) and the hinge mechanism 103 faces up, the state detection unit 115 detects the used shape of the laptop PC 1 as the tent shape, and determines the usage status mode to be the tent mode.

Further, FIG. 5D illustrates a shape used in a stand mode of the laptop PC 1 (stand shape). In this case, for example, the opening/closing angle θ is in a range from 190 degrees or more to less than 360 degrees (190°≤θ<360°). In the shape used in the stand mode (stand shape), since the surface F2 of the second chassis 102 faces down, the used state can be determined from the direction of acceleration (gravitational acceleration) detected by the acceleration sensor 37 (37A, 37B). When the opening/closing angle θ is in the range from 190 degrees or more to less than 360 degrees (190°≤θ<360°) and the surface F2 of the second chassis 102 faces down, the state detection unit 115 detects the used shape of the laptop PC 1 as the stand shape, and determines the usage status mode to be the stand mode.

Further, FIG. 5E illustrates a shape used in a tablet mode of the laptop PC 1 (tablet shape). In this case, for example, the opening/closing angle θ is 360 degrees (θ=) 360°. When the opening/closing angle θ is 360 degrees (θ=360°), the state detection unit 115 detects the used shape of the laptop PC 1 as the tablet shape, and determines the usage status mode to be the tablet mode.

Returning to FIG. 3, the change processing unit 116 is a functional unit implemented, for example, by various device drivers or the BIOS. Upon changing to the Modern Standby by the mode control unit 111, the change processing unit 116 changes the stopped state of each of the predetermined functions (for example, the functions of WoV, HPD, and the like) according to the usage status mode based on the setting information stored in the setting information storage unit 221. Upon changing to the Modern Standby, for example, the change processing unit 116 acquires, from the setting information storage unit 221, setting information corresponding to the usage status mode (for example, the tent mode or the like) based on the used shape detected by the state detection unit 115 to change the stopped state of each of the predetermined functions based on the acquired setting information. Here, the predetermined functions are functions managed by the device drivers.

For example, when the usage status mode is the tent mode, the change processing unit 116 refers to the setting information storage unit 221 as illustrated in FIG. 4 to change the settings corresponding to the tent mode (to stop the functions of keyboard, WoV, and HPD). For example, when stopping the WoV function, the change processing unit 116 stops power supply to the audio system 24, the microphone 241, the speaker 242, and the like through the embedded controller 31. Further, when stopping the HPD function, the change processing unit 116 stops power supply to the camera 27, the proximity sensor 36, and the like through the embedded controller 31.

Further, for example, when the usage status mode is the laptop mode, the change processing unit 116 refers to the setting information storage unit 221 as illustrated in FIG. 4 to change the settings corresponding to the laptop mode (make the keyboard, WoV, and HPD functions work).

Note that, upon changing each function to be stopped or working, the change processing unit 116 stops hardware operation related to each function (such as to stop power supply from the power supply circuit 33) or makes the function work through the embedded controller 31.

Further, upon changing from the S0 state to the S0ix state (the state where some functions are stopped) by the mode control unit 111 again, the change processing unit 116 causes the state detection unit 115 to check whether the usage status mode is changed or not. When the usage status mode is changed, the change processing unit 116 changes the stopped state of each predetermined function based on setting information corresponding to the changed usage status mode.

For example, when the usage status mode is changed upon execution of background processing by the main control unit 10 in the Modern Standby, the change processing unit 116 changes the stopped state of the predetermined function based on setting information corresponding to the changed usage status mode.

The setting change unit 117 displays, on the display unit 14, the setting information corresponding to the usage status mode. Further, the setting change unit 117 changes the setting information based on input information from the input unit 32, and stores the changed setting information in the setting information storage unit 221.

The embedded controller 31 is a sub-control unit operating independently of the main control unit 10 in a manner to be operable in the low power consumption mode. The embedded controller 31 controls various connected devices, and outputs an event that occurred in each of the various devices to the main control unit 10 as an event trigger.

Next, the operation of the laptop PC 1 according to the present embodiment will be described with reference to the drawings.

Figure 6:
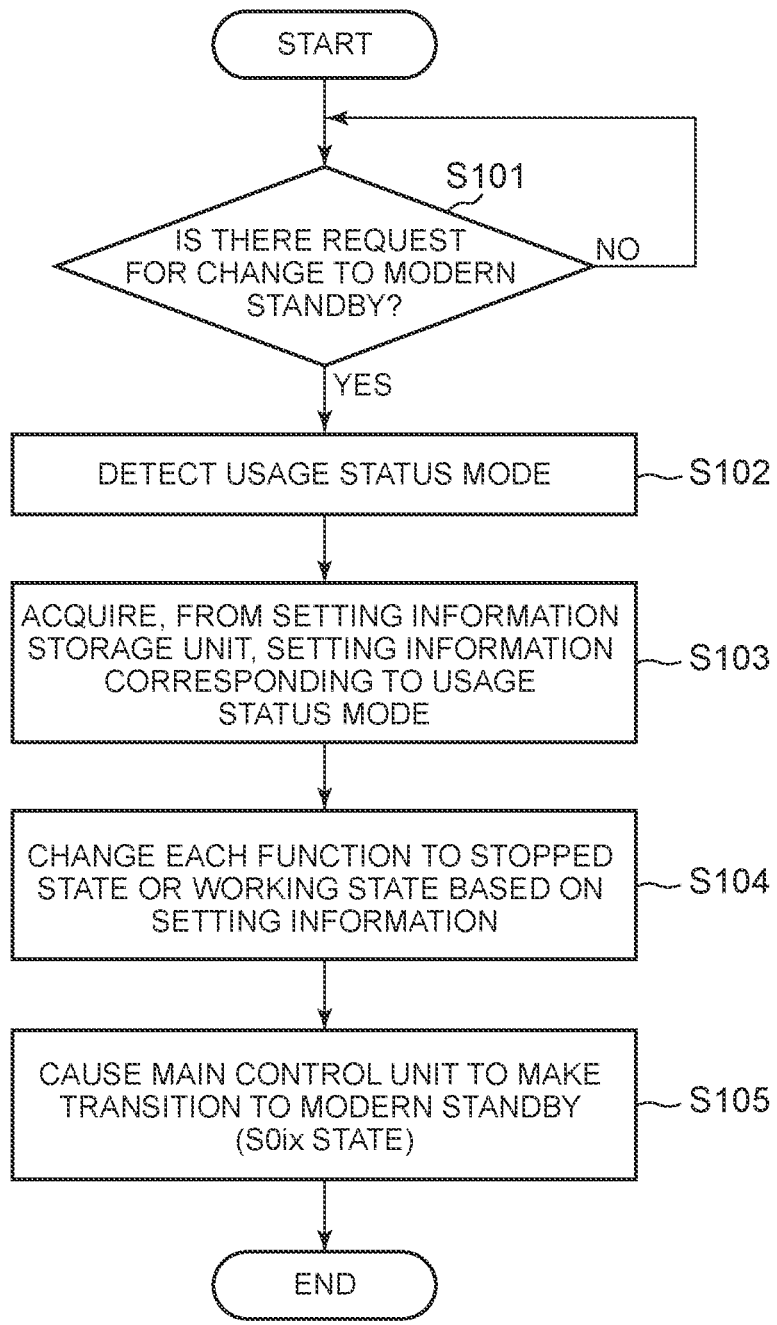
FIG. 6 is a flowchart illustrating an example of transition processing of the laptop PC to Modern Standby according to the present embodiment.

FIG. 6 is a flowchart illustrating an example of transition processing of the laptop PC 1 to the Modern Standby according to the present embodiment.

As illustrated in FIG. 6, the mode control unit 111 of the laptop PC 1 first determines whether there is a request for a change to the Modern Standby or not (step S101). When there is the request for the change to the Modern Standby (step S101: YES), the mode control unit 111 proceeds to step S102. On the other hand, when there is no request for the change to the Modern Standby (step S101: NO), the mode control unit 111 returns to step S101.

In step S102, the change processing unit 116 of the laptop PC 1 detects the usage status mode. The change processing unit 116 requests the state detection unit 115 of the laptop PC 1 to detect the usage status mode. The state detection unit 115 detects the used shape based, for example, on the opening/closing angle θ described above to determine the usage status mode. The change processing unit 116 detects the usage status mode by acquiring the usage status mode determined by the state detection unit 115.

Next, the change processing unit 116 acquires, from the setting information storage unit 221, setting information corresponding to the usage status mode (step S103). For example, the change processing unit 116 reads, from the setting information storage unit 221, setting information corresponding to the usage status mode as illustrated in FIG. 4. For example, when the usage status mode is the tent mode, the change processing unit 116 acquires such setting information that the functions of keyboard, WoV, and HPD are "Stopped."

Next, based on the setting information, the change processing unit 116 changes each function to the stopped state or working state (step S104). For example, the change processing unit 116 stops the functions of keyboard, WoV, and HPD based on the setting information. For example, when the WoV function is stopped, the change processing unit 116 requests the WoV processing unit 113 to stop the function, and the WoV processing unit 113 stops the WoV function using the BIOS, the embedded controller 31, and the like.

Next, the mode control unit 111 causes the main control unit 10 to make the transition to the Modern Standby (S0ix state) (step S105). The mode control unit 111 changes the main control unit 10 from the S0 state to the S0ix state as the Modern Standby. After the processing in step S105, the mode control unit 111 ends the processing for the transition to the Modern Standby.

Figure 7:
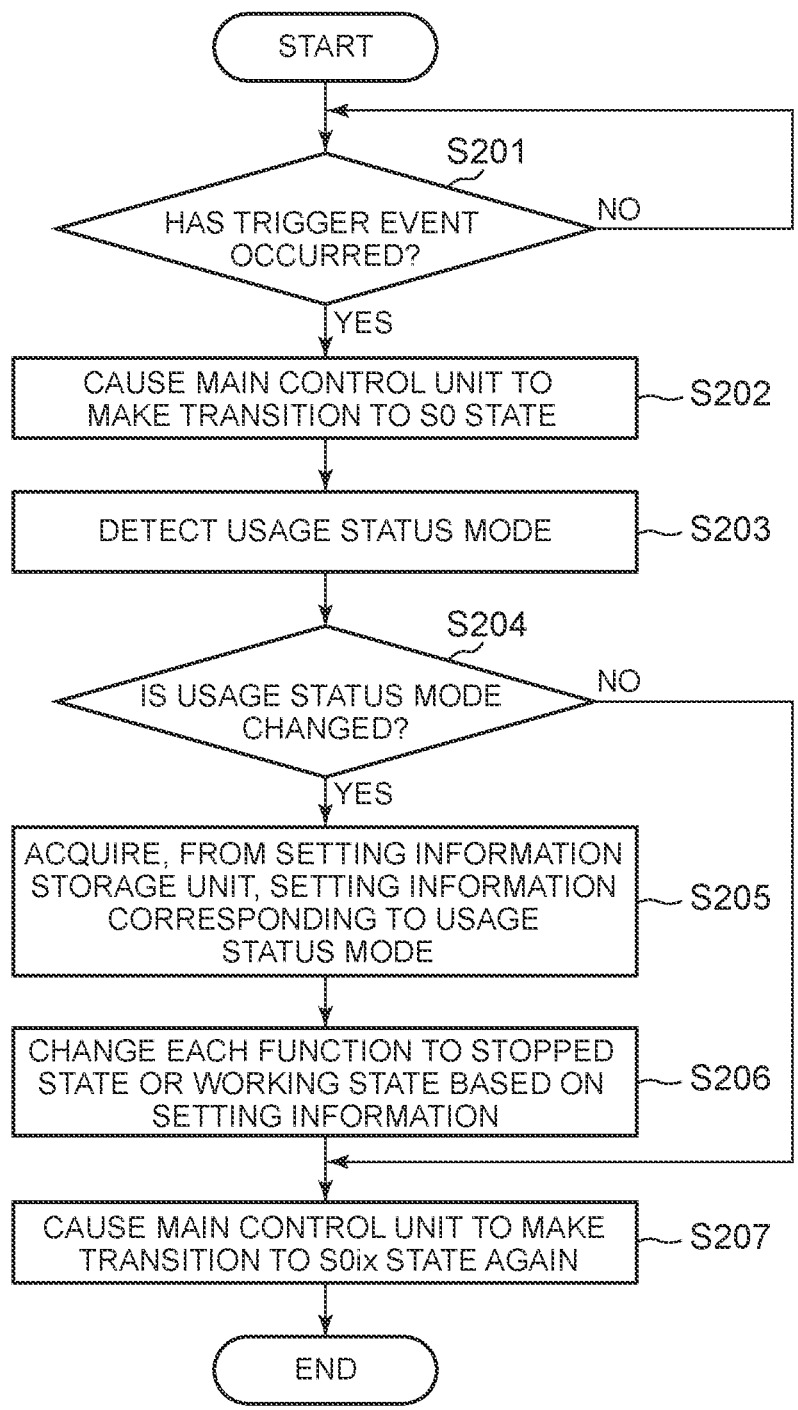
FIG. 7 is a flowchart illustrating an example of setting change processing for changing the usage status of the laptop PC according to the present embodiment.

Referring next to FIG. 7, setting change processing for changing the usage status in the Modern Standby will be described.

FIG. 7 is a flowchart illustrating an example of setting change processing for changing the usage status of the laptop PC 1 according to the present embodiment.

As illustrated in FIG. 7, the mode control unit 111 determines whether an event trigger has occurred during the Modern Standby (step S201). For example, the operation is started when the embedded controller 31 outputs an event trigger from the acceleration sensor 37 (37A, 37B) or the keyboard (input unit 32) and the main control unit 10 receives the event trigger. The mode control unit 111 determines whether the event trigger has occurred or not. When the event trigger has occurred (step S201: YES), the mode control unit 111 proceeds to step S202. On the other hand, when no event trigger has occurred (step S201: NO), the mode control unit 111 returns to step S201 to wait for the occurrence of an event trigger.

In step S202, the mode control unit 111 causes the main control unit to make a transition to the S0 state. The mode control unit 111 makes a transition from the S0ix state to the S0 state through the embedded controller 31.

Next, the change processing unit 116 detects the usage status mode (step S203). The change processing unit 116 detects the usage status mode by acquiring the usage status mode determined by the state detection unit 115.

Next, the change processing unit 116 determines whether the usage status mode is changed or not (step S204). When the usage status mode is changed (step S204: YES), the change processing unit 116 proceeds to step S205. On the other hand, when the usage status mode is not changed (step S204: NO), the change processing unit 116 proceeds to step S207.

Since the processing in step S205 and step S206 is the same as the processing in step S103 and step S104 illustrated in FIG. 6 described above, the description thereof will be omitted here.

Next, in step S207, the mode control unit 111 causes the main control unit 10 to make the transition to the S0ix state again. The mode control unit 111 changes the main control unit 10 again from the S0 state to the S0ix state as the Modern Standby. After the processing in step S207, the mode control unit 111 ends the processing for the transition to the Modern Standby.

Figure 8:
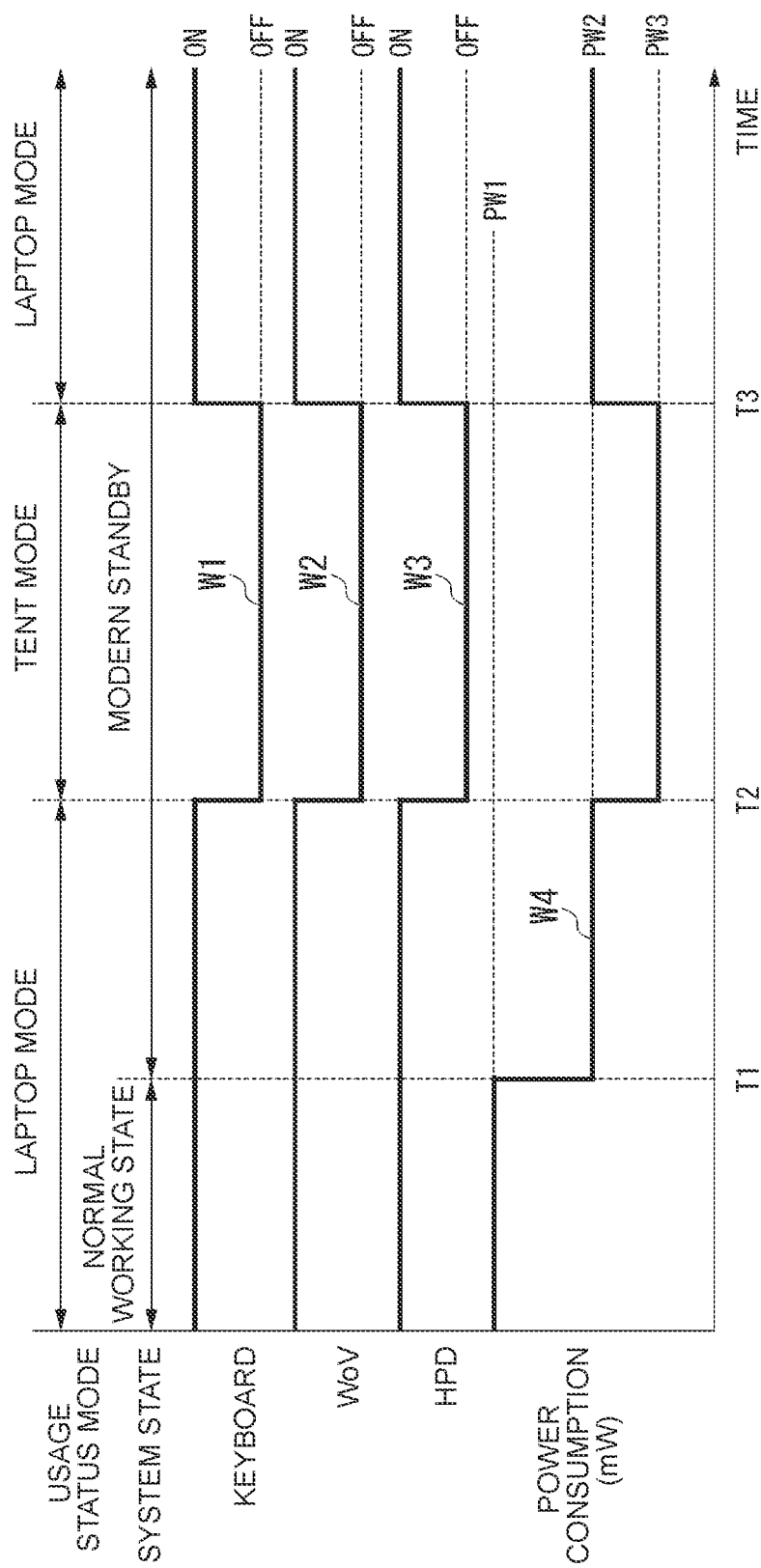
FIG. 8 is a chart illustrating an example of power consumption changes with respect to used shapes of the laptop PC according to the present embodiment.

Referring next to FIG. 8, power consumption changes with respect to used shapes of the laptop PC 1 according to the present embodiment will be described.

FIG. 8 is a chart illustrating an example of power consumption changes with respect to used shapes of the laptop PC 1 according to the present embodiment.

In FIG. 8, waveform W1 to waveform W3 represent the stopped state (and working state) of respective functions of keyboard, WoV, and HPD. In each function, "ON" represents the working state, while "OFF" represents the stopped state. Further, waveform W4 represents changes in the power consumption of the laptop PC 1. Further, the abscissa of each waveform represents time.

In the example illustrated in FIG. 8, operation when the usage status mode is changed from the laptop mode to the tent mode and further restored to the laptop mode in the Modern Standby will be described.

Note that the initial state in the example illustrated in FIG. 8 is as follows: The usage status mode is the laptop mode, where each of the functions of keyboard, WoV, and HPD is in the working state, the system state is the normal operating state (S0 state), and the value of power consumption is a power value PW1.

At time T1, in response to the request for the change to the Modern Standby, the mode control unit 111 and the change processing unit 116 perform the processing illustrated in FIG. 6 described above to make the transition to the Modern Standby (S0ix state). In this case, since the usage status mode is the laptop mode, each of the functions of keyboard, WoV, and HPD is in the working state. Further, since the transition to the S0ix state as the Modern Standby is made, power consumption is reduced from the power value PW1 to a power value PW2.

Next, at time T2, when a user changes the usage status mode of the laptop PC 1 to the tent mode, the embedded controller 31 outputs an event trigger from the acceleration sensor 37 (37A, 37B), and the mode control unit 111 and the change processing unit 116 perform the processing illustrated in FIG. 6 described above to change the working state (or stopped state) of each function to a setting corresponding to the tent mode. In this case, since the usage status mode is the tent mode, each of the functions of keyboard, WoV, and HPD is in the stopped state. Further, since each of the functions of keyboard, WoV, and HPD is put into the stopped state, power consumption is reduced from the power value PW2 to a power value PW3.

Next, at time T3, when the user changes the usage status mode of the laptop PC 1 to the laptop mode, the embedded controller 31 outputs the event trigger from the acceleration sensor 37 (37A, 37B), and the mode control unit 111 and the change processing unit 116 perform the processing illustrated in FIG. 6 described above to change the working state (or stopped state) of each function to a setting corresponding to the laptop mode. In this case, since the usage status mode is the laptop mode, each of the functions of keyboard, WoV, and HPD is in the working state. Further, since each of the functions of keyboard, WoV, and HPD is put into the working state, power consumption increases from the power value PW3 to the power value PW2.

Thus, in the laptop PC 1 according to the present embodiment, each function to be made to work (or to be stopped) in the Modern Standby can be set properly according to the usage status.

Figure 9:
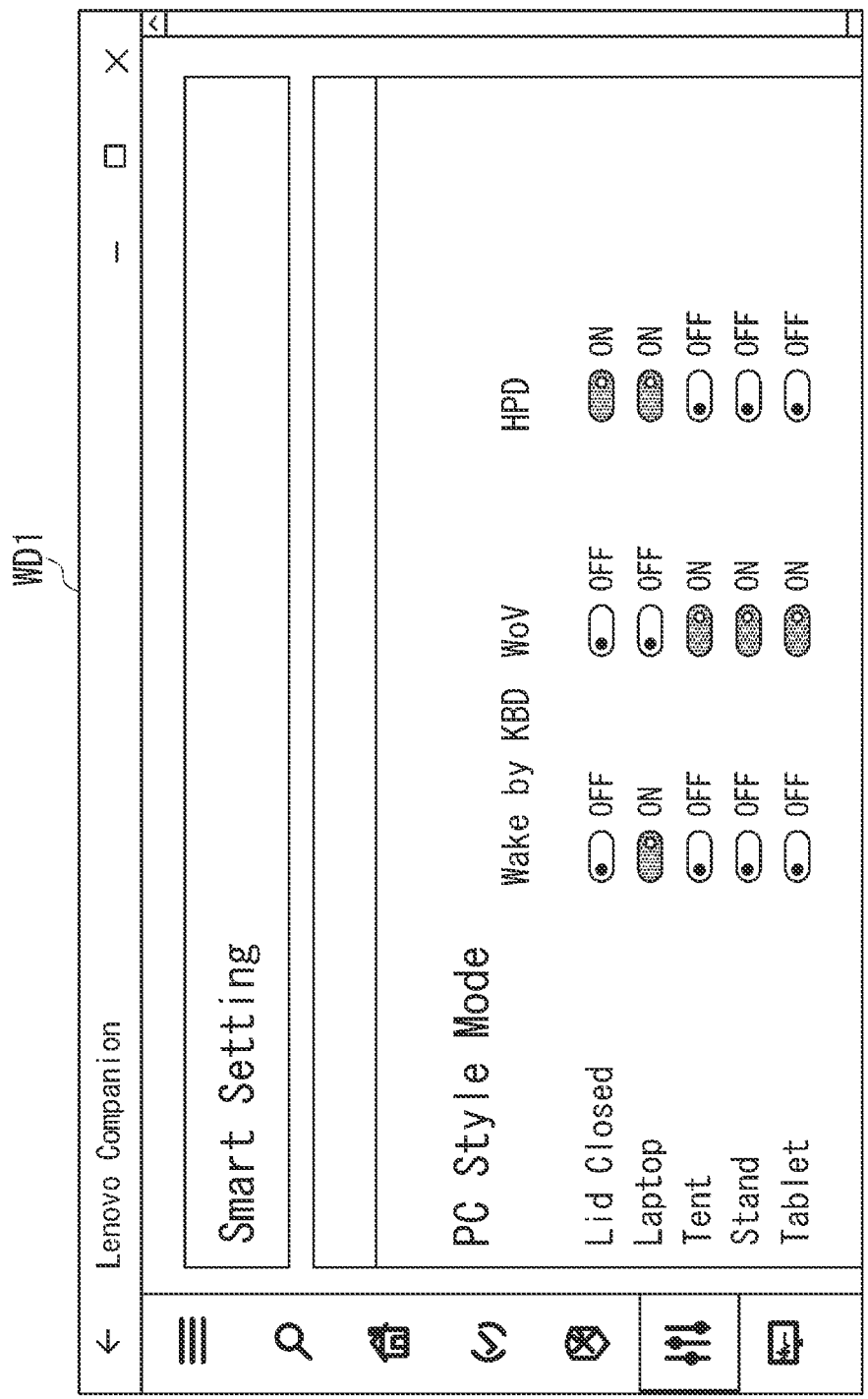
FIG. 9 is a diagram illustrating an example of a setting information change screen of the laptop PC according to the present embodiment.

Referring next to FIG. 9, setting information change processing by the setting change unit 117 will be described.

FIG. 9 is a diagram illustrating an example of a setting information change screen of the laptop PC 1 according to the present embodiment.

A window WD1 illustrated in FIG. 9 represents the setting information change screen displayed on the display unit 14. In response to a user's request, the setting change unit 117 reads setting information stored in the setting information storage unit 221, and displays, on the display unit 14, the window WD1 as illustrated in FIG. 9. In other words, the setting change unit 117 displays, in the window WD1, the usage status mode and setting information indicative of whether to stop each function in the Modern Standby or not.

Further, in the window WD1, the setting change unit 117 can change setting information on each function based on input information from the input unit 32 with a user's operation. In this case, the setting change unit 117 stores the changed setting information in the setting information storage unit 221.

Thus, in the laptop PC 1 according to the present embodiment, setting information indicative of whether to stop each function in the Modern Standby or not can be changed and set by the user.

Figure 12:
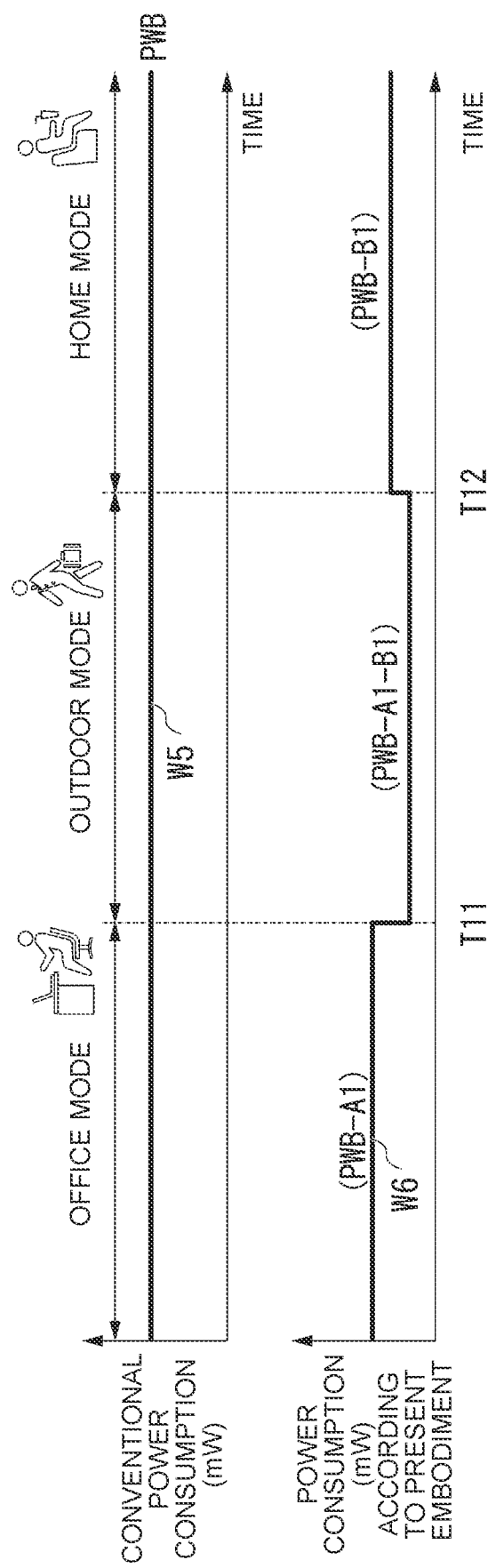
FIG. 12 is a chart illustrating an example of power consumption changes with respect to usage locations of the laptop PC 1 according to the present embodiment.

In the laptop PC 1 according to the present embodiment described above, the example in which the setting of each function to be stopped in the Modern Standby is changed according to the usage status mode based on the used shape is described, but the present invention is also available for usage status modes based on another type of usage status. Referring to FIG. 10 to FIG. 12, another example of usage status modes will be described.

FIG. 10 is a table illustrating another example of data in the setting information storage unit 221 according to the present embodiment.

The example illustrated in FIG. 10 is an example in which the usage status is a usage location and each usage status mode is based on the location. In other words, the usage status mode is, for example, an office mode, an outdoor mode, a home mode, or the like.

In the example illustrated in FIG. 10, when the "Usage status mode" is the office mode, it is represented that the WoV function is "Stopped" and the HPD function is "Working." When the "Usage status mode" is the outdoor mode, it is represented that the WoV function is "Stopped" and the HPD function is "Stopped." Further, when the "Usage status mode" is the home mode, it is represented that the WoV function is "Working" and the HPD function is "Stopped."

In this case, for example, the state detection unit 115 determines the usage status mode such as the office mode or the home mode based on position information on an access point connected by the WLAN card 25 or position information by an unillustrated GPS (Global Positioning System).

In this example, usage locations are included in the usage status, and the change processing unit 116 changes the stopped state of each predetermined function based on setting information corresponding to the usage status mode based on each usage location.

Since processing of the mode control unit 111 and the change processing unit 116 in this case is basically the same as the processing illustrated in FIG. 6 and FIG. 7 described above, the description thereof will be omitted here.

FIG. 11 is a table illustrating an example of setting information on the usage location and the function according to the present embodiment.

As illustrated in FIG. 11, the change processing unit 116 executes a setting change according to the usage status mode based on the usage location. Note that power consumption in the WoV function is a power value A1 and power consumption in the HPD function is a power value B1. Here, it is assumed that the power value A1 of WoV is smaller than the power value B1 of HPD (A1<B1).

FIG. 12 is a chart illustrating an example of power consumption changes with respect to usage locations of the laptop PC 1 according to the present embodiment.

In FIG. 12, waveform W5 is a waveform of power consumption in conventional Modern Standby. Further, waveform W6 is a waveform of power consumption in the Modern Standby of the laptop PC 1 according to the present embodiment. Further, the abscissa of each waveform represents time.

In the example illustrated in FIG. 12, power consumption changes when the usage status mode is changed in the order of the office mode, the outdoor mode, and the home mode are represented.

In the conventional Modern Standby, since each predetermined function is made to work or stopped regardless of the usage status, the power consumption becomes a constant power value PWB as the base value as indicated by the waveform W5.

In contrast, in the case of the laptop PC 1 according to the present embodiment, since the WoV function in the Modern Standby is set to the stopped state and the HPD function is set to the working state at first in the office mode (see FIG. 11), the power consumption becomes a power value (PWB-A1) (see waveform W6).

Further, when the usage status mode is changed from the office mode to the outdoor mode at time T11, since the WoV function in the Modern Standby is set to the stopped state and the HPD function is set to the stopped state in the outdoor mode (see FIG. 11), the power consumption becomes a power value (PWB-A1-B1) (see waveform W6). In other words, the laptop PC 1 can automatically reduce power consumption in the outdoor mode such as during moving.

Further, when the usage status mode is changed from the outdoor mode to the home mode at time T12, since the WoV function in the Modern Standby is set to the working state and the HPD function is set to the stopped state in the home mode (see FIG. 11), the power consumption becomes a power value (PWB-B1) (see waveform W6).

Here, the power value (PWB-A1), the power value (PWB-A1-B1), and the power value (PWB-B1) are all smaller than the power value PWB of the conventional Modern Standby.

Thus, the laptop PC 1 according to the present embodiment can reduce power consumption in the Modern Standby properly according to the usage status mode.

In the present embodiment described above, the examples in which the usage status mode is a usage status mode based on the used shape (such as the tent mode) and a usage status mode based on the usage location (such as the office mode) are described, but the present invention is not limited thereto. For example, the present invention may also support usage status modes based on usage time and usage status modes based on power state.

In other words, it may be such that the usage time is included in the usage status, and the change processing unit 116 changes the stopped state of each predetermined function based on setting information corresponding to the usage status mode based on the usage time.

It further be such that the power state indicative of whether the laptop PC 1 is operated by the power of the built-in battery or not, or the power state indicative of the battery remaining capacity is included in the usage status, and the change processing unit 116 changes the stopped state of each predetermined function based on setting information corresponding to the usage status mode based on the power state.

As described above, the laptop PC 1 (information processing apparatus) according to the present embodiment includes the main control unit 10, the setting information storage unit 221, the mode control unit 111, and the change processing unit 116. The main control unit 10 is a main control unit 10 which executes processing based on the OS. The main control unit 10 can change to the Modern Standby (low power consumption mode) for stopping some functions including the display unit 14 while making a predetermined function work. The setting information storage unit 221 stores the usage status mode based on the usage status and setting information indicative of whether or not to stop the predetermined function, implemented by a device driver added to the OS, in the Modern Standby in association with each other. The mode control unit 111 changes the main control unit 10 to the Modern Standby. Upon changing to the Modern Standby by the mode control unit 111, the change processing unit 116 changes the stopped state of the predetermined function according to the usage status mode based on the setting information stored in the setting information storage unit 221.

Thus, since the laptop PC 1 according to the present embodiment can change functions to be stopped and functions to be made to work in the Modern Standby according to the usage status mode based on the usage status, power consumption can be reduced properly according to the usage status in the Modern Standby.

Further, the laptop PC 1 according to the present embodiment includes the state detection unit 115 which detects the usage status. The change processing unit 116 acquires, from the setting information storage unit 221, setting information corresponding to the usage status mode based on the usage status detected by the state detection unit 115 to change the stopped state of each predetermined function based on the acquired setting information.

Thus, the laptop PC 1 according to the present embodiment can change the stopped state of the predetermined function properly according to the usage status in the Modern Standby by causing the state detection unit 115 to detect the usage status properly.

Further, the laptop PC 1 according to the present embodiment includes the acceleration sensor 37 (37A, 37B) which detects the acceleration of the own apparatus (laptop PC 1). Then, the used shape upon using the own apparatus is included in the usage status. The state detection unit 115 detects the used shape based on the acceleration detected by the acceleration sensor 37 (37A, 37B). The change processing unit 116 changes the stopped state of each predetermined function based on setting information corresponding to the usage status mode (such as the tent mode or the laptop mode) based on the used shape.

Thus, the laptop PC 1 according to the present embodiment can change the stopped state of the predetermined function properly according to the usage status mode based on the used shape in the Modern Standby.

Further, in the present embodiment, the usage location is included in the usage status. The change processing unit 116 changes the stopped state of each predetermined function based on setting information corresponding to the usage status mode (such as the office mode or the home mode) based on the usage location.

Thus, the laptop PC 1 according to the present embodiment can change the stopped state of the predetermined function properly according to the usage status mode based on the usage location in the Modern Standby.

Further, in the present embodiment, it may be such that the usage time is included in the usage status, and the change processing unit 116 changes the stopped state of each predetermined function based on setting information corresponding to the usage status mode (such as the office mode or the home mode) based on the usage time.

Thus, the laptop PC 1 according to the present embodiment can change the stopped state of the predetermined function properly according to the usage status mode based on the usage time in the Modern Standby.

Further, in the present embodiment, it may be such that the power state indicative of whether the laptop PC 1 is operated by the power of the built-in battery or not, or the power state indicative of the battery remaining capacity is included in the usage status, and the change processing unit 116 changes the stopped state of each predetermined function based on setting information corresponding to the usage status mode (such as a battery-driven mode or an external power mode) based on the power state.

Thus, the laptop PC 1 according to the present embodiment can change the stopped state of the predetermined function properly according to the usage status mode based on the power state in the Modern Standby.

Further, the laptop PC 1 according to the present embodiment includes the embedded controller 31 (sub-control unit) operating independently of the main control unit 10 in a manner to be operable in the low power consumption mode. When an event trigger has occurred via the embedded controller 31, the mode control unit 111 makes a transition to the normal working state (S0 state), and changes again to the state (S0ix state) in which some functions are stopped after executing processing corresponding to the event trigger. Upon changing again to the state (S0ix state) in which some functions are stopped, when the usage status mode is changed, the change processing unit 116 changes the stopped state of each predetermined function based on setting information corresponding to the changed usage status mode.

When the usage status mode based on the usage status is changed during the Modern Standby, such as when the embedded controller 31 outputs an event trigger, the laptop PC 1 according to the present embodiment can change the stopped state of the predetermined function properly according to the changed usage status mode (see FIG. 8 and FIG. 12). Thus, the laptop PC 1 according to the present embodiment can further reduce power consumption according to the usage status in the Modern Standby.

Further, in the present embodiment, background processing by the main control unit 10 is executable in the low power consumption mode. When the usage status mode is changed upon execution of the background processing by the main control unit 10, the change processing unit 116 changes the stopped state of each predetermined function based on setting information corresponding to the changed usage status mode.

Thus, since the laptop PC 1 according to the present embodiment can change the stopped state of the predetermined function properly according to the changed usage status mode upon execution of the background processing in the Modern Standby, power consumption can further be reduced according to the usage status.

Further, the laptop PC 1 according to the present embodiment includes the setting change unit 117. The setting change unit 117 displays, on the display unit 14, setting information corresponding to the usage status mode. Further, the setting change unit 117 changes the setting information based on input information from the input unit 32, and stores the changed setting information in the setting information storage unit 221 (see FIG. 9).

Thus, the laptop PC 1 according to the present embodiment enables the user to freely change the settings of functions to be stopped and functions to be made to work in the Modern Standby. In other words, on the laptop PC 1 according to the present embodiment, each user can flexibly change the functions to be stopped and the functions to be made to work in the Modern Standby.

Further, a control method according to the present embodiment is a control method for the laptop PC 1 including the main control unit 10 and the setting information storage unit 221 described above. The control method includes a mode control step and a change processing step. In the mode control step, the mode control unit 111 changes the main control unit 10 to the low power consumption mode. In the change processing step, upon changing to the low power consumption mode by the mode control unit 111, the change processing unit 116 changes the stopped state of each predetermined function according to the usage status mode based on the setting information stored in the setting information storage unit 221.

The control method according to the present embodiment has the same effect as the laptop PC 1 described above. Thus, the control method can reduce power consumption properly according to the usage status in the Modern Standby.

Note that the present invention is not limited to the aforementioned embodiment, and changes can be made without departing from the spirit of the present invention. For example, the example in which the information processing apparatus is the laptop PC 1 is described in the aforementioned embodiment, but the present invention is not limited thereto, and the information processing apparatus may also be any other information processing apparatus such as a tablet terminal.

Further, the examples in which the kinds of usage status are the shape used, the usage location, the usage time, and the power state are described in the aforementioned embodiment, but the present invention is not limited thereto. For example, any other kind of usage status may also be used, such as the connection status of an externally connected device through USB or Bluetooth (registered trademark). Further, the usage status may be a combination of these kinds of usage status, and the usage status modes may be usage status modes based on any other kind of usage status or a combination of these kinds of usage status.

Further, in the aforementioned embodiment, the change processing unit 116 is described as an independent functional unit inside the main control unit 10, but the present invention is not limited thereto. For example, the change processing unit 116 may take such a form as to be included in the mode control unit 111, the keyboard processing unit 112, the WoV processing unit 113, the HPD processing unit 114, the state detection unit 115, and the like.

Further, the example in which the setting information storage unit 221 is realized by the BIOS memory 22 is described in the aforementioned embodiment, but the present invention is not limited thereto. The setting information storage unit 221 may be realized by the HDD 23 or any other storage unit.

Further, the example in which the predetermined functions implemented by device drivers are the functions of WoV, HPD, smart LED, booting via the touch panel, and volume adjustment of the speaker 242 is described in the aforementioned embodiment, but the present invention is not limited thereto. The present invention may also be applied to any other function managed by any other device driver.

Further, the example in which the low power consumption mode is the Modern Standby of Windows 10 (Windows is a registered trademark) is described in the aforementioned embodiment, but the present invention is not limited thereto. The present invention may also be applied to a similar low power consumption mode of any other OS.

Note that the laptop PC 1 including the components described above has a computer system therein. Then, a program for implementing the function of each component included in the laptop PC 1 described above may be recorded on a computer-readable recording medium so that the program recorded on this recording medium is read into the computer system and executed to perform processing in each component included in the laptop PC 1 described above. Here, the fact that "the program recorded on the recording medium is read into the computer system and executed" includes installing the program on the computer system. It is assumed that the "computer system" here includes the OS and hardware such as a peripheral device and the like.

Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. Thus, the recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the laptop PC 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the above-described functions may be realized as an integrated circuit such as LSI (Large Scale Integration). Each of the above-described functions may be a processor implemented individually, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

| [Description of Symbols] | |
|---|---|
| 1 | laptop PC |
| 10 | main control unit |
| 11 | CPU |
| 12 | main memory |
| 13 | video subsystem |
| 14 | display unit |
| 21 | chipset |
| 22 | BIOS memory |
| 23 | HDD |
| 24 | audio system |
| 25 | WLAN card |
| 26 | USB connector |
| 27 | camera |
| 31 | embedded controller (EC) |
| 32 | input unit |
| 33 | power supply circuit |
| 34 | battery |
| 35 | Hall sensor |
| 36 | proximity sensor |
| 37, 37A, 37B | acceleration sensor |
| 101 | first chassis |
| 102 | second chassis |
| 103, 103-1, 103-2 | hinge mechanism |
| 111 | mode control unit |
| 112 | keyboard processing unit |
| 113 | WoV processing unit |
| 114 | HPD processing unit |
| 115 | state detection unit |
| 116 | change processing unit |
| 117 | setting change unit |
| 221 | setting information storage unit |
| 241 | microphone |
| 242 | speaker |

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
   a main control unit that:
      executes processing based on an operating system (OS), and
      changes to a low power consumption mode to stop some functions including a display unit while making a predetermined function work;
   a setting information storage unit that stores a usage status mode based on usage status and setting information in association with one another, wherein the setting information indicates whether to stop the predetermined function implemented by a device driver added to the OS in the low power consumption mode;
   a mode control unit that changes the main control unit to the low power consumption mode; and
   a change processing unit that changes a stopped state of the predetermined function according to the usage status mode based on the setting information stored in the setting information storage unit upon the mode control unit changing to the low power consumption mode.

2. The information processing apparatus according to claim 1, further comprising:
   a state detection unit that detects the usage status, wherein the change processing unit acquires, from the setting information storage unit, the setting information corresponding to the usage status mode based on the usage status detected by the state detection unit to change the stopped state of the predetermined function based on the acquired setting information.

3. The information processing apparatus according to claim 2, further comprising:
   an acceleration sensor that detects acceleration of an own apparatus, wherein
   the usage status includes a used shape upon using the own apparatus,
   the state detection unit detects the used shape based on the acceleration detected by the acceleration sensor, and
   the change processing unit changes the stopped state of the predetermined function based on the setting information corresponding to the usage status mode based on the used shape.

4. The information processing apparatus according to claim 2, wherein
   the usage status includes a usage location, and
   the change processing unit changes the stopped state of the predetermined function based on the setting information corresponding to the usage status mode based on the usage location.

5. The information processing apparatus according to claim 2, wherein
   the usage status includes a usage time, and
   the change processing unit changes the stopped state of the predetermined function based on the setting information corresponding to the usage status mode based on the usage time.

6. The information processing apparatus according to claim 2, wherein
   the usage status includes a power state that indicates whether the information processing apparatus is operated by power of a built-in battery or a power state that indicates a remaining capacity of the battery, and
   the change processing unit changes the stopped state of the predetermined function based on the setting information corresponding to the usage status mode based on the power state.

7. The information processing apparatus according to claim 1, further comprising:
   a sub-control unit operating independently of the main control unit in a manner to be operable in the low power consumption mode, wherein
   when an event trigger has occurred via the sub-control unit, the mode control unit makes a transition to a normal working state and changes again to the state in which the some functions are stopped after execution of processing corresponding to the event trigger, and
   when the usage status mode is changed upon changing again to the state in which the some functions are stopped, the change processing unit changes the stopped state of the predetermined function based on the setting information according to the changed usage status mode.

8. The information processing apparatus according to claim 1, wherein
   the main control unit executes background processing in the low power consumption mode, and
   when the usage status mode is changed upon execution of the background processing by the main control unit, the change processing unit changes the stopped state of the predetermined function based on the setting information according to the changed usage status mode.

9. The information processing apparatus according claim 1, further comprising:
   a setting change unit that:
   displays, on the display unit, the setting information corresponding to the usage status mode, and
   changes the setting information based on input information from an input unit and stores the changed setting information in the setting information storage unit.

10. A control method for an information processing apparatus that includes a main control unit that executes processing based on an operating system (OS) and that changes to a low power consumption mode to stop some functions including a display unit while making a predetermined function work, and a setting information storage unit that stores a usage status mode based on usage status and setting information in association with one another, wherein the setting information indicates whether to stop the predetermined function implemented by a device driver added to the OS in the low power consumption mode, the control method comprising:
   causing a mode control unit to change the main control unit to the low power consumption mode; and
   causing a change processing unit to change a stopped state of the predetermined function according to the usage status mode based on the setting information stored in the setting information storage unit upon the mode control unit changing to the low power consumption mode.

* * * * *